United States Patent [19]

Bailey et al.

[11] Patent Number: 4,547,551

[45] Date of Patent: Oct. 15, 1985

[54] ETHYLENE POLYMER BLENDS AND PROCESS FOR FORMING FILM

[75] Inventors: Fay W. Bailey; William M. Whitte, both of Bartlesville, Okla.

[73] Assignee: Phillips Petroleum Company, Bartlesville, Okla.

[21] Appl. No.: 624,315

[22] Filed: Jun. 25, 1984

Related U.S. Application Data

[62] Division of Ser. No. 391,056, Jun. 22, 1982, Pat. No. 4,461,873.

[51] Int. Cl.[4] .................... C08L 23/18; C08L 23/06
[52] U.S. Cl. .................... 525/240; 264/564; 264/171
[58] Field of Search .................... 525/240; 264/564

[56] References Cited

U.S. PATENT DOCUMENTS

| | | | |
|---|---|---|---|
| 2,868,762 | 1/1959 | Oakes | 525/240 |
| 3,179,720 | 4/1965 | Hillmer | 525/240 |
| 3,183,283 | 5/1965 | Reding | 525/240 |
| 4,230,831 | 10/1980 | Sakurai et al. | 525/240 |
| 4,336,352 | 6/1982 | Sakurai et al. | 525/240 |

*Primary Examiner*—Carman J. Seccuro
*Attorney, Agent, or Firm*—John R. Casperson

[57] ABSTRACT

Ethylene polymer blends of a high molecular weight ethylene polymer, preferably an ethylene-mono-1-olefin copolymer, and a low molecular weight ethylene polymer preferably an ethylene homopolymer, both preferably with narrow molecular weight distribution and low levels of long chain branching exhibit excellent film properties and good environmental stress crack behavior superior to that expected for polyethylene of comparable density and melt flow. These resins are useful for the manufacture of film or in blow molding techniques, the production of pipes and wire coating.

11 Claims, No Drawings

ETHYLENE POLYMER BLENDS AND PROCESS FOR FORMING FILM

This is a divisional of application Ser. No. 391,056 filed June 22, 1982 now U.S. Pat. No. 4461873.

BACKGROUND OF THE INVENTION

The present invention relates to the production and use of blends of ethylene polymers of different molecular weight. More specifically the present invention relates to film grade ethylene polymer blends.

In recent years high density polyethylene film has been commercially very successful as a replacement for kraft paper. Several new film resins have therefore been introduced on the market. Among these new resins are high molecular weight high density polyethylene resins having a broad molecular weight distribution.

The production of high density polyethylene today can be called a mature technology. One of the continuing goals in this technology is to develop catalysts with high productivities so that a catalyst removal step can be avoided in the polymer production. Such high productivity catalysts have been developed in recent years. These catalysts sometimes produce ethylene polymers with a narrow molecular weight distribution.

Thus, resins produced with certain high productivity catalysts in view of their narrow molecular weight distribution are often not ideal for the above described application of the high density polyethylene as a film forming resin. It would be very desirable to have an ethylene polymer composition available which can be produced with high productivity catalysts and which still has film grade resin qualities. There is a further specific problem encountered in the production of resins for applications as films. The film properties desired and the desired processability of the resin are often in conflict. Improvements on the processability frequently result in reduced film qualities and vice versa.

The desired properties of film for many applications conflict with each other. For example, polymers with good toughness (impact resistance) are usually deficient in stiffness for grocery sacks. Those that make stiff sacks are too brittle. Thus, most film polymers are a compromise: a balance of performance features.

THE INVENTION

It is one object of this invention to provide an ethylene polymer resin composition useful for such applications as film-production.

Another object of this invention is to provide ethylene polymer resin mixtures that are satisfactory with respect to both the film properties and the processability of the resin.

Another object of this invention is to provide ethylene polymer resin for blown film applications.

A further object of this invention is to provide ethylene polymer resin compositions, the polymers of which can be made with high productivity olefin polymerization catalysts.

Yet another abject of this invention is to provide a process for the production of such resin compositions.

Still another object of this invention is to provide a process for the manufacture of polyolefin film from such a resin composition which has acceptable film properties.

A yet further object of this invention is to provide an ethylene polymer film having high strength and, in particular, high tear strength, puncture resistance, impact strength and high environmental stress crack resistance (ESCR).

An important object of this invention is to provide a resin composition having a better balance of stiffness and impact and ESCR as compared to known resins.

In accordance with this invention it has been found that a mixture of a low molecular weight ethylene polymer and a high molecular weight ethylene polymer exhibits both desirable processing properties and excellent film properties when extruded into a polyolefin film. The polymer blends so composed are useful for the production of polyolefin film, particularly by blown tubing techniques, and for blow-molding (e.g. to produce bottles), pipe production and wire coating.

The low molecular weight ethylene polymer, the high molecular weight ethylene polymer and the blend are further characterized in Table I.

TABLE I

| PROPERTIES OF THE ETHYLENE POLYMERS AND BLENDS | | | |
|---|---|---|---|
| | High Molecular Weight Ethylene Polymer | Low Molecular Weight Ethylene Polymer | Blend |
| HLMI (g/10 min) | | | |
| generally | 0.1–1.5 | — | 3–34 |
| preferred | 0.2–0.6 | — | 5–12 |
| MI (g/10 min) | | | |
| generally | — | 45–300 | 0.01–0.6 |
| preferred | — | 100–300 | 0.03–0.5 |
| Density (g/cc) | | | |
| generally | about 0.930–0.955 | about 0.945–0.975 | .940–.965 |
| preferred | about .930–.945 | about .950–.975 | .950–.960 |
| Structure (Monomers) | | | |
| generally | Ethylene or Ethylene and 0 to 30 wt. % $C_{3-10}$ olefins | Ethylene or Ethylene and 0 to 30 wt. % $C_{3-10}$ olefins | — |
| preferred | Ethylene and 1 to 15 wt. % $C_{3-7}$ olefins | 0.5 to 5 wt. % $C_{3-10}$ olefins | — |
| most preferred | Ethylene and 5 to 10 wt. % $C_{4-10}$ | Ethylene ("Homopolymer" i.e. one that contains | — |

TABLE I-continued

| PROPERTIES OF THE ETHYLENE POLYMERS AND BLENDS | | | |
|---|---|---|---|
| | High Molecular Weight Ethylene Polymer | Low Molecular Weight Ethylene Polymer | Blend |
| | olefins (random copolymer) | less than about 2 weight % $C_{4-10}$ olefin comonomer, most preferably a true ethylene homopolymer) | |
| Branching | essentially no branching other than short chain branching from comonomer | essentially linear | |
| Molecular Weight Distribution (SEC) (HI = $M_w/M_n$) | | | |
| generally | <10 | <6 | >18 |
| preferred | 4–9 | 2–4 | 20–35 |

The various polymer properties in this table and following tables are determined as follows:
MI (melt index, g/10 min, 190° C.): ASTM D 1238-65T, load of 2.16 kg
HLMI (High load melt index, g/10 min, 190° C.): ASTM D 1238-65T, load of 21.6 kg
Density(g/cc): ASTM D 1505-68
$M_w$ = weight average molecular weight, determined by size exclusion chromatography (SEC)
$M_n$ = number average molecular weight, determined by size exclusion chromatography (SEC)
HI = heterogeneity index = $M_w/M_n$ The preferred polymers and blends have molecular weights and molecular weight distributions roughly as shown in the following table:

TABLE II

| Approximate Values | Typical Range |
|---|---|
| Component #1 (High Molecular Weight) | |
| $M_w \sim 500{,}000$ | 400,000 to 700,000 |
| $M_n \sim 70{,}000$ | |
| $M_w/M_n \sim 7.5$ | 4 to 9 |
| Component #2 (Low Molecular Weight) | |
| $M_w \sim 15{,}000$ | 10,000 to 20,000 |
| $M_n \sim 5{,}000$ | |
| $M_w/M_n \sim 3$ | 2 to 4 |
| Blend | |
| $M_w \sim 270{,}000$ | 200,000 to 400,000 |
| $M_n \sim 10{,}000$ | |
| $M_w/M_n \sim 27$ | 20 to 35 |

The presently preferred ethylene polymers and copolymers within the limits set forth above are those produced with high productivity catalysts such as titanium/magnesium catalysts used in conjunction with organoaluminum cocatalysts. Such catalysts as well as polymerization processes to make such ethylene polymers are described in more detail in European Patent Application Nos. 81 106 259.5 and 81 102 181.5 disclosure of which is herein incorporated by reference.

In accordance with the first embodiment of this invention a process to produce an ethylene polymer composition is provided. The process comprises blending the two ethylene polymers described above in relative quantities described below. The blending can be done by simply dry blending the two kinds of polymers in fluff (powder) form. Other possibilities to mix the polymers include melt blending in a pelletizing extruder. Banbury ® mixers and single or twin screw extruders can be utilized. The preferred method is dry blending followed by melt blending. The blending conditions depend upon the blending technique employed. If a dry blending of the polymer fluff is the blending technique, the blending conditions may include temperatures from room temperature up to about 120° C. and blending times in the range of a few seconds to minutes, e.g. 2 seconds to 5 minutes. If extrusion blending is used, the temperature of the polymers introduced into the extruder will be generally between room temperature and a temperature near the melting point of the polymer; the outlet temperature of the extrusion blended polymer will be in the range between the melting point of the polymer and up to 160° C. above the melting point. The individual polymer particles usually remain in the extruder for a time of about 10 seconds to about 15 minutes. If solution blending techniques are employed the blending temperature will generally be 25° to 50° C. above the cloud point of the solution involved.

Another embodiment of this invention is a polymer blend of the two ethylene polymers as defined above. Such a blend consists essentially of the two polymers and commonly used polymer additives such as antioxidants, UV stabilizers, fillers, pigments etc. The main polymer ingredients are present in this blend in quantities based on the total polymer as specified in Table III.

TABLE III

| BLEND COMPOSITION (WEIGHT %) | | |
|---|---|---|
| | Generally | Preferred |
| High molecular weight ethylene polymer (HLMI 0.1 to 1.5) | 40 to 70 | about 50 to about 55 |
| Low molecular weight ethylene polymer (MI 45–300) | 60 to 30 | about 50 to about 45 |

The resins blended are preferably selected from the HLMI and the MI ranges respectively so that a high molecular weight resin from the lower end of the range for HLMI values is blended with a low molecular weight resin from the higher end of the range for the MI values and vice versa.

Other embodiments of this invention are a method to produce an ethylene polymer film and the film so produced. The method of producing the ethylene polymer film includes extruding a molten web composed of the ethylene polymer blend defined above which is drawn to the desired thickness, generally in the range of 0.1 to 5 mil. Extruding a flat film (width between 1 foot and 15 feet) and extruding a film tubing are both contemplated in this embodiment. The tubular extrusion with a blow/up ratio of tubing diameter to orifice die diameter in the range of about 2:1 to 10:1 is presently preferred. Typical dies have orifice diameters of 1" to 100".

The invention will be still more fully understood from the following examples which are intended to illustrate the invention and further preferred embodiments thereof without undue limitation of the scope of this invention.

The experimental methods and procedures employed in the following examples were as follows:

Ethylene Polymer Production

In a pilot plant several ethylene homopolymers and ethylene 1-hexane copolymers were produced with high activity titanium/magnesium catalysts. These catalysts are described in detail in the above cited European Patent Applications. Polymers produced were either high molecular weight or low molecular weight polymers as further specified in the following examples. For stabilization during the processing the following additives were admixed with the polymers:

| | |
|---|---|
| BHT (2,6-di-t-butyl-4-methylphenol) | 0.05 weight % |
| DLTDP (dilauryl thiodipropionate) | 0.03 weight % |
| Calcium stearate | 0.04 weight % |

In some of the examples 0.1 weight % of Irganox 1010 ® (tetrakis[methylene(3,5-di-t-butyl-4-hydroxyhydrocinnamate)]methane commercially available from Ciba-Geigy) was also added.

The mixing of the two ethylene polymer components was carried out in a variety of apparatus. A Henschel mixer was used to blend the fluff. A Farrel Banbury size 00, a Farrel 2FCM and a Davis-Standard 38 mm single screw extruder were used as shown in the following tables. The polymer blend obtained from the Banbury mixer was finished in a Foremost QG10-10 granulator, a Davis-Standard 150S 38 mm extruder or respectively a Cumberland 6 pelletizer.

The ethylene polymer blend was converted to a blown film using a 38 mm Davis-Standard extruder of 24-1 length/diameter ratio screw. The film die was 10.2 cm in diameter with a 0.56 mm die gap. An air ring was used to cool and support the ethylene polymer bubble in a film tower. The extrusion temperature was in the range of 250±20° C. The film produced generally had a thickness of 1 mil. The blow/up ratio was 4:1 and the linear drawdown ratio was 5.5:1.

The various properties of the ethylene polymer film were measured as follows:

Dart Impact

The dart impact resistance of the one mil film was measured using ASTM D 1709-75. This method measured the energy required to break the film upon impact of a free falling dart. This method established the weight of the dart dropped from a height of 26 inches which caused 50 percent of the samples to break. The staircase method was used to determine the 50 percent failure level, and the missile weight increment was 15 g.

Elmendorf Tear

The Elmendorf tear resistance, called tear in Table XV, was measured using ASTM D 1922. This is a modification for polymer film adapted from the Elmendorf tear test used for paper. This method determined the average force in grams per specimen required to propagate a tear through 2.5 inches of film. The method was used to rank relative tearing resistance of different blends.

Patterson Puncture

The resistance to puncture/propagation of tear was measured by a modification of ASTM D 2582. This test method is used for determination of dynamic tear resistance or resistance to snagging of plastic film. The ASTM method was modified for lower weight carriages.

Spencer Impact

Spencer impact was measured using ASTM D 3420. The following formula was used to obtain an impact value in joules.

$$E = RC/100$$

E = Energy to rupture, Joules
C = Apparatus capacity, 1.35 Joules
R = Scale Reading on a 0 to 100 scale.

This method was more rapid than dart impact and could be used as a control test while the film line was running. This test measured the energy necessary to burst and penetrate the center of a one mil thick specimen, mounted between two rings with a 3½ inch diameter.

Fish Eye

Fish eye count or gel count was made on two sections of film one mil thick and one square foot in area. Only fish eyes greater than ten mils in at least one dimension were counted. In the case of film with fish eye count greater than 50 per square foot a five square inch section of film was counted.

Tensile Strength and Elongation

Tensile strength and elongation were measured in accordance with ASTM D 638, 2"/min.

Shore Hardness

Shore D hardness was measured in accordance with ASTM D 2240-68.

RDI

Rheological distribution index (RDI) is an arbitrary rheological index value obtained from measurements made on a polymer sample with a Rheometrics Dynamic Spectrometer (Rheometric's Company). A molten polymer sample is subjected to a sinusoidal, oscillating shear strain between two parallel circular plates at 190° C. The frequency of oscillation is varied from $10^{-1}$ to $5 \times 10^2$ radians/sec. A log-log plot of frequency vs. dynamic loss modulus is made and the slope of the curve determined when the loss modulus is equal to $10^5$ dynes/cm$^2$. The reciprocal of the slope is defined as RDI. The larger the RDI value, the greater the shear response of the polymer. Since polymer shear response is related to its molecular weight distribution (the broader the distribution the greater the shear response) the RDI value is thought to provide a reliable indication of molecular weight distribution.

Flexural Modulus, MPa

The flexural modulus is determined in accordance with ASTM D 790.

ESCR (Bell)

The Environmental Stress Cracking Resistance was determined in accordance with ASTM D 1693-60, condition A.

Viscosity

The dynamic shear viscosity, in units of $10^5$ Poise, is obtained from the Rheometrics Dynamic Spectrometer as is the RDI. The viscosity reported is that at 0.1 radians/second (frequency of oscillation).

Throughout all of the following examples, the following abbreviations will be used.
PE: ethylene homopolymer
EHC: ethylene 1-hexene copolymer, 75–99 wt. % ethylene and 1 to 25 wt. % 1-hexene.

EXAMPLE I

In this example film was produced from commercially available ethylene polymer resins Hostalen ® GM9255 (Hoechst), and TR130 polyethylene (Phillips Petroleum Company) produced with a chromium oxide catalyst, and an ethylene polymer blend as specified mixed in different equipment as shown in the following table. The film test results as well as the properties of the polymer blend used for the production of the film are given in the following Table IV.

In comparing polymers and blends, in a given series, constant conditions were employed and the film was extruded on the same day if at all possible.

TABLE IV

| | FILM RESIN PROPERTIES | | | | | | | |
|---|---|---|---|---|---|---|---|---|
| Ethylene Polymer: | Dart Impact g 26"/13" | Elmendorf Tear g MD/TD | Patterson Puncture Kg MD/TD | Spencer Impact J | Fish Eye Count count/ft$^2$ gel/char | Melt Index g/10 min. | HLMI g/10 min. | Density g/cc |
| Control: | | | | | | | | |
| Hostalen GM9255 | 100/240 | 22/290 | 1.7/2.7 | 0.24 | 3/0.1 | 0.05 | 8.4 | 0.957 |
| TR130 | <50/130 | 77/170 | 1.8/2.0 | 0.18 | 2.5/0.1 | 0.28 | 21.5 | 0.942 |
| Blends: | | | | | | | | |
| 50 wt. % EHC 0.27 HLMI 0.936 g/cc 50 wt. % PE 280 MI 0.970 g/cc | | | | | | | | |
| Banbury mixed | 200/390 | 56/290 | 2.9/3.0 | 0.32 | 3.0/4.0 | 0.09 | 7.6 | 0.959 |
| 38 mm Davis-Standard Single Screw Extruder only | 190/390 | 51/360 | 2.7/3.0 | 0.34 | 40/1.0 | 0.09 | 8.2 | 0.957 |
| 2FCM blended only | 210/400 | 44/400 | 2.9/3.1 | 0.34 | 7.0/1.0 | 0.09 | 8.4 | 0.9597 |

The data in Table IV compare the properties for the preferred ethylene polymer blend in accordance with this invention, which is an approximately 50/50 wt. % blend of the low molecular weight and the high molecular weight ethylene polymer with the film properties achieved with two commercial resins and three experimental blends. The ethylene polymer blend resulted in an improved impact, tear and puncture resistance compared to the commercial film resins even though measurable physical properties were similar. The fish eye count was increased when the mixing was scaled up to the 38 mm Davis-Standard single screw extruder but the char was reduced by the continuous mixing method. It is also to be noted that the blend obtained in the 2FCM apparatus had reduced fish eye count compared to the single screw extruder blend.

EXAMPLE II

In this example the influence of the MI (melt index) of the low molecular weight ethylene polymer component in the blend was tested. The components used and the results obtained as well as the mixing techniques employed are shown in the following Table V.

TABLE V

| SLOT FILM STUDY OF EFFECT OF MELT INDEX OF LOW MOLECULAR WEIGHT COMPONENT | | | | | |
|---|---|---|---|---|---|
| EHC 1.3 HLMI, 0.940 g/cc | 55 | 55 | 55 | 55 | 55 |
| PE 158 MI, 0.966 g/cc | 45 | | | | |
| PE 67 MI, 0.968 g/cc | | 45 | | | |
| PE 47 MI, 0.971 g/cc | | | 45 | 45 | 45 |
| Mixing: | | | | | |
| Henschel Powder Mix | yes | yes | yes | yes | yes |
| Force Feeder | yes | yes | yes | yes | yes |
| Screw Type | 2.2/1SS[1] | 2.2/1SS | 2.2/1SS | 2.2/1SS | DDD[2] |
| Static Mixer[3] | yes | yes | yes | yes | yes |
| Temp. °C. | 220 | 220 | 220 | 160 | 220 |
| Results: | | | | | |
| Fish Eye Count/ft$^2$ | 564 | 840 | 192 | 312 | 132 |
| Melt Index, g/10 min | 0.23 | 0.22 | 0.23 | 0.23 | 0.19 |
| HLMI, g/10 min | 16.4 | 12.5 | 12.7 | 12.7 | 11.5 |
| Density, g/cc | 0.9577 | 0.9568 | 0.9559 | 0.9559 | 0.9550 |
| RDI | 1.58 | 1.52 | 1.44 | 1.49 | 1.53 |

TABLE V-continued
SLOT FILM STUDY OF EFFECT OF MELT INDEX OF LOW MOLECULAR WEIGHT COMPONENT

| ESCR, hours | >1000 | >1000 | >1000 | >1000 | >1000 |
|---|---|---|---|---|---|

[1] 2.2/1SS is a single stage screw having a compression ratio of 2.2.
[2] DDD is a devolatilizing screw with a double Dulmage mixing section.
[3] Static mixer section (Kenics Co.) located between extruder and pelletizing die.

The results in Table V indicate that while the fish eye count was reduced by using a mixing screw, decreasing the melt temperature from 220° C. to 160° C. did not reduce the fish eye count. This is a significant and advantageous result because it shows that an increase in temperature does not increase the fish eye count. The data of this table also indicate that the melt index or molecular weight of the low molecular weight component was not a controlling factor in the fish eye count.

EXAMPLE III

The previous example was essentially repeated with a group of different resins. The ingredients and quantities used as well as the data obtained as shown in Table VI.

TABLE VI

| Ethylene Polymers: | | | | | | | | | |
|---|---|---|---|---|---|---|---|---|---|
| EHC 0.22 HLMI, 0.936 g/cc | 45 | 45 | 45 | 50 | 50 | 50 | 55 | 55 | 55 |
| PE 158 MI, 0.966 g/cc | 55 | | | 50 | | | 45 | | |
| PE 67 MI, 0.968 g/cc | | 55 | | | 50 | | | 45 | |
| PE 47 MI, 0.971 g/cc | | | 55 | | | 50 | | | 45 |
| Mixing: | | | | | | | | | |
| Henschel Powder Mix | yes | yes | yes | yes | yes | yes | yes | yes | yes |
| Force Feeder | yes | yes | yes | yes | yes | yes | yes | yes | yes |
| Screw Type | DDD[2] | DDD[2] | DDD[2] | DDD[2] | DDD[2] | DDD[2] | DDD[2] | DDD[2] | DDD[2] |
| Static Mixer[3] | yes | yes | yes | yes | yes | yes | yes | yes | yes |
| Temp. °C. | 180 | 180 | 180 | 180 | 180 | 180 | 180 | 200 | 200 |
| Results: | | | | | | | | | |
| Fish Eye Count/ft² | 1300 | 1600 | 2300 | 620 | 250 | 1000 | 280 | 60 | 230 |
| Melt Index, g/10 min | 0.10 | 0.08 | 0.09 | 0.06 | 0.06 | 0.06 | 0.05 | 0.04 | 0.05 |
| HLMI, g/10 min | 10.2 | 7.5 | 8.0 | 5.9 | 5.0 | 5.0 | 3.7 | 3.1 | 3.5 |
| Density, g/cc | 0.9611 | 0.9591 | 0.9581 | 0.9589 | 0.9591 | 0.9570 | 0.9581 | 0.9553 | 0.9562 |
| RDI | 1.75 | 1.76 | 1.73 | 1.57 | 1.68 | 1.67 | 1.54 | 1.55 | 1.64 |
| ESCR, hours | >1000 | >1000 | >1000 | >1000 | >1000 | >1000 | >1000 | >1000 | >1000 |

[2] [3] See footnotes of Table V.

The data in Table VI demonstrate a strong dependency of the fish eye count upon the quantity of high molecular weight polymer utilized. The higher the quantity of the high molecular weight component in the resin the lower the fish eye count became. Fish eye count and blend melt index are again shown to be independent of the melt index of the low molecular weight component.

EXAMPLE IV

The previous example was again essentially repeated with the components as shown in Table VII. In this experiment the high molecular weight polyethylene was not an ethylene 1-hexene copolymer but rather an ethylene homopolymer.

TABLE VII

| Ethylene Polymers: | | | | | | | | | |
|---|---|---|---|---|---|---|---|---|---|
| PE 0.10 HLMI, 0.940 g/cc | 45 | 45 | 45 | 50 | 50 | 50 | 55 | 55 | 55 |
| PE 158 MI, 0.966 g/cc | 55 | | | 50 | | | 45 | | |
| PE 67 MI, 0.968 g/cc | | 55 | | | 50 | | | 45 | |
| PE 47 MI, 0.971 g/cc | | | 55 | | | 50 | | | 45 |
| Mixing: | | | | | | | | | |
| Henschel Powder Mix | yes | yes | yes | yes | yes | yes | yes | yes | yes |
| Force Feeder | yes | yes | yes | yes | yes | yes | yes | yes | yes |
| Screw Type | DDD[2] | DDD[2] | DDD[2] | DDD[2] | DDD[2] | DDD[2] | DDD[2] | DDD[2] | DDD[2] |
| Static Mixer[3] | yes | yes | yes | yes | yes | yes | yes | yes | yes |
| Temp. °C. | 230 | 230 | 230 | 230 | 230 | 230 | 230 | 240 | 240 |
| Results: | | | | | | | | | |
| Fish Eye Count/ft² | 2900 | 2000 | 3300 | 400 | 400 | 1400 | 100 | 190 | 250 |
| Melt Index, g/10 min | 0.02 | 0.02 | 0.03 | 0.013 | 0.01 | 0.014 | 0.006 | 0.007 | 0.007 |
| HLMI, g/10 min | 6.8 | 4.4 | 5.8 | 4.3 | 3.5 | 3.4 | 2.3 | 1.90 | 1.79 |
| Density, g/cc | 0.9641 | 0.9635 | 0.9615 | 0.9634 | 0.9612 | 0.9609 | 0.9607 | 0.9605 | 0.9597 |
| RDI | 1.92 | 1.91 | 1.97 | 1.96 | 1.92 | 1.93 | 1.84 | 1.82 | 1.86 |
| ESCR, hours | 155 | 381 | 109 | 305 | 275 | 240 | 373 | 640 | 524 |

[2] [3] See footnotes of Table V.

The data in Table VII show the same trend as observed in the earlier examples, namely that the fish eye count goes down with increasing quantity of high molecular weight ethylene polymer. Additionally, however, the above data show that the environmental stress crack resistance is substantially reduced when an ethylene homopolymer is used as compared to the previous examples where an ethylene 1-hexene copolymer was used as the high molecular weight component.

EXAMPLE V

In this example various blends of 60 weight percent of high molecular weight resin and 40 weight percent of low molecular weight resin were tested. The polymers used and the results obtained as well as the mixing procedure are shown in Table VIII.

TABLE VIII

| Ethylene Polymer: | | | | |
|---|---|---|---|---|
| PE 47 MI, 0.9706 g/cc | 40 | 40 | | |
| EHC 49 MI, 0.9543 g/cc | | | 40 | |
| EHC 45 MI, 0.9489 g/cc | | | | 40 |
| PE 1.5 HLMI, 0.9522 g/cc | | | 60 | 60 |
| EHC 1.3 HLMI, 0.9447 g/cc | | 60 | | |
| EHC 1.3 HLMI, 0.9404 g/cc | 60 | | | |
| Mixing: | | | | |
| Henschel Mix | yes | yes | yes | yes |
| Banbury Mix | yes | yes | yes | yes |
| Pelletize | yes | yes | yes | yes |
| Properties: | | | | |
| Melt Index, g/10 min. | 0.20 | 0.19 | 0.23 | 0.25 |
| HLMI, g/10 min. | 10.2 | 9.6 | 10.9 | 12.2 |
| Density, g/cc | 0.9560 | 0.9577 | 0.9550 | 0.9553 |
| Flexural Modulus, MPa | 1370 | 1520 | 1400 | 1260 |
| ESCR, hours | >1000 | >1000 | 87 | 87 |
| Film Test Results: | | | | |
| Dart Impact, g, 26"/13" | <50/100 | <50/100 | (surged) | <50/70 |
| Elmendorf Tear, g, MD/TD[1] | 60/150 | 50/130 | No good | 50/110 |
| Patterson Puncture, Kg, MD/TD | 2.4/2.6 | 2.2/2.7 | film | 1.7/2.3 |
| Fish Eye Count, Hard Gel/Char | 3/8 | 5/10 | 2/16 | 3/22 |

[1]MD is machine direction; TD is transverse direction.

The data in Table VIII again show a strong dependency of the environmental stress crack resistance upon the structure of the high molecular weight ethylene polymer utilized. Whereas the blend having an ethylene 1-hexene copolymer as the high molecular weight component shows very good environmental stress crack resistance, the blend containing an ethylene homopolymer as the high molecular weight ethylene polymer component in the blend shows a substantially reduced environmental stress crack resistance even though the blend densities and melt flows are very close.

EXAMPLE VI

In this example a blend of a low molecular weight ethylene homopolymer and a high molecular weight ethylene 1-hexene copolymer as indicated and specified in the following table were used with varying mixing techniques. The results are shown in Table IX.

TABLE IX

| Ethylene Polymer: | | | | |
|---|---|---|---|---|
| PE 47 MI, 0.9706 g/cc | 45 | 45 | 45 | 45 |
| EHC 1.3 HLMI, 0.9404 g/cc | 55 | 55 | 55 | 55 |
| Zinc Stearate, Part by Weight | 0.05 | 0 | 0 | 0 |
| Ethylene-bis-stearamide, Part by Weight | 0 | 0.05 | 0.05 | 0 |
| Mixing: | | | | |
| Henschel Mix | yes | yes | yes | yes |
| Banbury Mix | yes | no | yes | no |
| Pelletize | yes | yes | yes | no |
| Properties: | | | | |
| Melt Index, g/10 min. | 0.47 | 0.42 | 0.25 | fluff feed |
| HLMI, g/10 min. | 28.7 | 27.1 | 14.0 | no pellets |
| Density, g/cc | 0.958 | 0.958 | 0.956 | |
| Flexural Modulus, MPa | 1490 | 1500 | 1450 | |
| ESCR, hours | >1000 | >1000 | >1000 | |
| Film Test Results: | | | | |
| Dart Impact, g, 26"/13" | 60/130 | 70/170 | 80/190 | 90/200 |
| Elmendorf Tear, g, MD/TD | 40/90 | 40/120 | 60/150 | 30/150 |
| Patterson Puncture, Kg, MD/TD | 1.7/2.2 | 1.6/2.1 | 2.4/2.8 | 1.7/2.5 |
| Fish Eye Count, Hard Gel/Char | 5/7 | 750/0 | 11/11 | 6/0 |

The right column of Table IX is particularly interesting since this run demonstrates the possibility for direct feeding of the polymer fluff mixture to a film extruder while obtaining excellent film test results. Thus no extruder or Banbury premixing was required in this run. A force feeder was used during the film extrusion to eliminate surging. The environmental stress crack resistance values for the pellet blends used in this example also were very good.

EXAMPLE VII

In this example the effect of the high molecular weight copolymer on the Dart impact strength was tested. The ethylene polymer components used and the results obtained are shown in Table X.

TABLE X

| Ethylene Polymer: | | | | | | |
|---|---|---|---|---|---|---|
| PE 47 MI, 0.9706 g/cc | 55 | | | 50 | | |
| EHC 49 MI, 0.9543 g/cc | | 55 | | | 50 | |
| EHC 45 MI, 0.9489 g/cc | | | 55 | | | 50 |
| PE 1.5 HLMI, 0.9522 g/cc | | 45 | 45 | | 50 | 50 |
| EHC 1.3 HLMI, 0.9447 g/cc | 45 | | | 50 | | |
| Mixing: | | | | | | |
| Henschel Mix | yes | yes | yes | yes | yes | yes |
| Pelletize | yes | yes | yes | yes | yes | yes |
| Kinetic Mixer | yes | yes | yes | yes | yes | yes |
| Banbury Mix | no | no | no | no | no | no |
| Properties: | | | | | | |
| Melt Index, g/10 min | 0.45 | 0.53 | 0.54 | 0.32 | 0.34 | 0.38 |
| HLMI, g/10 min | 29.1 | 33.8 | 33.9 | 20.2 | 20.2 | 22.2 |
| Density, g/cc | 0.9596 | 0.9558 | 0.9526 | 0.9598 | 0.9552 | 0.9525 |
| Flexural Modulus, MPa | 1680 | 1390 | 1280 | 1520 | 1340 | 1270 |
| ESCR, hours | 382 | 24 | 15 | 462 | 30 | 30 |

TABLE X-continued

| Film Test Results: | | | | | | |
|---|---|---|---|---|---|---|
| Dart Impact, g, 26"/13" | 79/160 | <50/120 | <50/120 | 82/190 | 65/160 | <50/130 |
| Elmendorf Tear, g, MD/TD | 30/110 | 30/120 | 30/100 | 40/110 | 30/190 | 40/210 |
| Patterson Puncture, Kg, MD/TD | 1.7/1.8 | 1.6/1.7 | 1.6/1.8 | 1.9/2.2 | 1.7/2.0 | 1.7/1.8 |
| Fish Eye Count, Hard Gel/Char | 950/0 | 780/0 | 660/0 | 7.5/0.8 | 7.6/0.2 | 15/0.2 |

The data in Table X demonstrate that the dart impact strength is improved if the high molecular weight portion is a copolymer rather than the low molecular weight portion of the ethylene polymer composition. A further surprising result is shown in the above table. Even though in the first and the fourth run the density of the resin mixture was higher than in the second and the fifth run, respectively, the dart impact strength was superior. This is very unusual and surprising because density has a primary influence on dart impact. Superior dart impact is generally associated with lower density. This blend composition thus shows a clear and unexpected advantage over conventional polyethylene film resins in that resin blends with higher density show better dart impact strength than those with comparatively lower density when the preferred copolymer distribution is used. Again a substantial dependency of the environmental stress crack resistance upon the structure of the high molecular weight ethylene polymer component is apparent from the above data. These data confirm the previous finding that the environmental stress crack resistance is best when the high molecular weight ethylene polymer component is an ethylene/1-hexene copolymer. The table above also shows the reduced Fish Eye Count for the 50/50 weight percent blend.

The above runs also demonstrate the feasibility of the elimination of a Banbury mixing step.

EXAMPLE VIII

This example was carried out to demonstrate that a blend of ethylene polymers with a density above 0.960 could have a high Dart impact strength when made into blown film. The components used and the results obtained are again shown in Table XI.

TABLE XI

| Ethylene Polymer: | | | | |
|---|---|---|---|---|
| PE 158 MI, 0.9664 g/cc | 60 | 60 | 60 | 60 |
| EHC 0.22 HLMI, 0.9359 g/cc | 40 | 40 | | |
| PE 0.10 HLMI, 0.9401 g/cc | | | 40 | 40 |
| Mixing: | | | | |
| Henschel Mix | yes | yes | yes | yes |
| Banbury Mix | no | yes | no | yes |
| Pelletized | yes | yes | yes | yes |
| Static Mixer | no | no | no | no |
| Properties: | | | | |
| Melt Index, g/10 min. | 0.17 | 0.17 | 0.08 | 0.08 |
| HLMI, g/10 min. | 17.6 | 15.6 | 12.6 | 8.5 |
| Density, g/cc | 0.9623 | 0.9626 | 0.9643 | 0.9639 |
| Flexural Modulus, MPa | 1680 | 1650 | 1800 | 1620 |
| ESCR, hours | >1000 | >1000 | 126 | 282 |
| Film Test Results: | | | | |
| Dart Impact, g, 26"/13" | <50/120 | 150/250 | <50/<50 | 180/340 |
| Elmendorf Tear, g, MD/TD | 30/180 | 50/180 | 40/120 | 40/390 |
| Patterson Puncture, Kg, MD/TD | 1.7/2.0 | 2.1/2.7 | 1.6/1.7 | 2.4/2.8 |

In the blends shown in Table XI very low HLMI polymers, i.e. ethylene polymers with high molecular weight, were used and they required more intensive mixing such as Banbury mixing in order to obtain good film properties. The data show, however, that the film properties are very good despite the fact that the blend density is about 0.96. ESCR again points out the significance of even small amounts of short branching in high molecular weight component.

EXAMPLE IX

Ethylene polymer resin blends were fabricated from ethylene polymers and using mixing techniques as indicated in the following table. The properties of the polymer blend as well as the film test results are also shown in Table XII. In the series employing extruder mixing, each composition was prepared with the indicated screw type.

TABLE XII

| Ethylene Polymer: | | | | | |
|---|---|---|---|---|---|
| PE 158 MI, 0.9664 g/cc | 60 | 60 | 60 | 60 | 60 |
| EHC 0.22 HLMI, 0.9359 g/cc | 40 | 40 | 40 | 40 | 40 |
| Mixing: | | | | | |
| Henschel Mix | yes | yes | yes | yes | yes |
| Banbury Mix | no | no | no | no | no |
| Davis-Standard | | | | | |
| 2.2/1SS Screw[1] | yes | no | no | no | no |
| 3.0/1SS Screw[2] | no | yes | no | no | no |
| TSD Screw[3] | no | no | yes | no | no |
| SSM Screw[4] | no | no | no | yes | no |
| DDD Screw[5] | no | no | no | no | yes |
| Static Mixer | yes | yes | yes | yes | yes |
| Properties: | | | | | |

TABLE XII-continued

| Melt Index g/10 min | 0.14 | 0.16 | 0.15 | 0.15 | 0.10 |
|---|---|---|---|---|---|
| HLMI, g/10 min | 15.7 | 20.4 | 18.6 | 19.8 | 19.6 |
| Density, g/cc | 0.9633 | 0.9628 | 0.9627 | 0.9624 | 0.9622 |
| Flexural Modulus, MPa | 1670 | 1670 | 1640 | 1690 | 1670 |
| ESCR, hours | >1000 | >1000 | >1000 | >1000 | >1000 |
| Film Test Results: | | | | | |
| Dart Impact, g, 26"/13" | <50/<50 | <50/<50 | <50/<50 | <50/<50 | <50/<50 |
| Elmendorf Tear, g, MD/TD | 27/270 | 28/190 | 28/160 | 30/160 | 27/180 |
| Patterson Puncture, Kg, MD/TD | 1.6/1.9 | 1.6/1.8 | 1.5/1.7 | 1.6/1.7 | 1.6/1.6 |

[1]Same as footnote 1, Table V.
[2]3.0/1SS is a single stage screw having a compression ratio of 3.0.
[3]TSD is a two-stage devolatilizing screw.
[4]SSM is a single screw with a Maddox mixing section.
[5]Same as footnote 2, Table V.

The poor results in Table XII, as indicated by dart impact data, for these blends which all contain less than 50% high molecular weight component, emphasizes the preference of a composition having at least 50% high molecular weight component. Banbury mixing is generally required for good results only if the composition falls below 50% in high molecular weight component.

EXAMPLE X

In this example resin blends were made using again ethylene polymers in quantities as specified in Table XIII. This table also shows the properties of the blend and the film test results.

TABLE XIII

| Ethylene Polymer: | | | | | | |
|---|---|---|---|---|---|---|
| Hostalen GM, 9255 | 100 | | | | | |
| TR130 | | 100 | | | | |
| PE 158 MI, 0.9664 g/cc | | | 60[1] | | | |
| EHC 0.10 HLMI, 0.9401 g/cc | | | 40 | | | |
| PE 275 MI, 0.9696 g/cc | | | | 50 | 50 | 50 |
| EHC 0.27 HLMI, 0.9355 g/cc | | | | 50 | 50 | 50 |
| Irganox 1010 (Part by Weight) | | | 0.1 | 0.1 | 0.1 | 0.1 |
| Mixing: | | | | | | |
| Commercial Resin Control | yes | yes | no | no | no | no |
| Henschel Mix | no | no | yes | yes | yes | yes |
| Double Pass-Double Letdown[2] | no | no | yes | no | no | no |
| DDD Screw | no | no | yes | no | no | no |
| Banbury Mix | no | no | no | yes | no | no |
| Pelletize, Davis-Standard: | no | no | yes | yes | yes | yes |
| 2.2 1/SS Screw | no | no | no | yes | yes | yes |
| Static Mixer | no | no | yes | yes | yes | yes |
| Properties: | | | | | | |
| Melt Index, g/10 min | 0.05 | 0.28 | 0.07 | 0.09 | 0.09 | 0.09 |
| HLMI, g/10 min | 8.4 | 21.5 | 14.9 | 7.6 | 8.2 | 7.2 |
| Density, g/cc | 0.9573 | 0.9417 | 0.9653 | 0.9592 | 0.9566 | 0.9575 |
| Flexural Modulus, MPa | 1570 | 918 | 1820 | 1540 | 1580 | 1490 |
| ESCR, hours | >1000 | >1000 | 132 | >1000 | >1000 | >1000 |
| RDI | 2.14 | 1.72 | 1.81 | 1.48 | 1.55 | 1.59 |
| Film Test Results: | | | | | | |
| Dart Impact, g, 26"/13" | 100/240 | <50/130 | <50/<50 | 200/390 | 190/390 | 180/370 |
| Elmendorf Tear, g, MD/TD | 20/290 | 77/170 | 26/150 | 56/290 | 51/360 | 45/290 |
| Patterson Puncture, Kg, MD/TD | 1.7/2.7 | 1.8/1.95 | 1.5/1.6 | 2.9/3.0 | 2.7/3.0 | 2.7/2.9 |
| Spencer Impact, Joules | 0.24 | 0.18 | 0.09 | 0.32 | 0.34 | 0.34 |
| Fish Eye Count, Gel/Char | 3/0.1 | 2.5/0.1 | 40/1.0 | 3.0/4.0 | 40/1.0 | 68/0 |

[1]This recipe gave poor film properties with 2-FCM mix only.
[2]The low molecular weight resin was blended with about 50 volume % of the high molecular weight resin, then extruded and pelletized. The pellets were blended with the remainder of the high molecular weight resin, then extruded and pelletized again.

The results of this table in this example again seem to indicate that for obtaining a satisfactory blend when using 60 parts by weight of the low molecular weight ethylene polymer and 40 parts by weight of a high molecular weight resin, a Banbury premixing or another intensive premixing is required for the use of the resin in film making processes.

The last three runs show that the ethylene polymer mixture of this invention results in superior resins for film production. The performance exceeds that expected for polyethylene of this density and melt flow.

The last two runs of this example are duplicate runs to test the reproducibility of the results which is, as can be seen, excellent.

EXAMPLE XI

A. Polymers

The polymers used in this example were all prepared in a pilot plant loop reactor using the Ti/Mg catalyst as described in European Patent Application No. 81 106 259.5. Relatively narrow molecular weight distribution polymers of widely different molecular weights were produced with this catalyst by changing the hydrogen concentration in the reactor. These polymers are recovered as fine powders or fluff which are easily blended by various techniques such as a Henschel mixer. A description of the different base resins used in this program is presented in Table XIV. All copolymers used 1-hexene as the comonomer.

TABLE XIV

DESCRIPTION OF BLEND COMPONENTS

A. High Molecular Weight Polymers (HMWP)

| | Density | HLMI |
|---|---|---|

TABLE XIV-continued
DESCRIPTION OF BLEND COMPONENTS

| HMWP | (g/cc) | (g/10 min.) |
|---|---|---|
| 1H | 0.9360 | 0.24 |
| 2H | 0.9355 | 0.30 |
| 3H | 0.9380 | 0.37 |
| 4H* | 0.9490 | 1.41 |
| 5H* | 0.9500 | 1.56 |
| 6H* | 0.9480 | 0.89 |
| 7H | 0.9445 | 1.40 |
| 8H | 0.9419 | 2.04 |
| 9H | 0.9388 | 1.80 |
| 10H | 0.9393 | 1.48 |
| 11H | 0.9377 | 1.71 |
| 12H | 0.9331 | 1.41 |
| 13H | 0.9312 | 1.45 |

B. Low Molecular Weight Polymers (LMWP)

| LMWP | Density (g/cc) | Melt Index (g/10 min.) |
|---|---|---|
| 20L* | 0.9675 | 67 |
| 21L* | 0.9696 | 275 |
| 22L* | 0.9700 | 146 |
| 23L* | 0.9700 | 212 |
| 24L* | 0.9690 | 108 |
| 25L | 0.9700 | 150 |
| 26L | 0.9600 | 98 |
| 27L | 0.9550 | 106 |

*indicates homopolymers. All others are 1-hexene copolymers.

B. Mixing and Compounding

For stabilization during processing 0.05 weight % BHT, 0.03 weight % DLTDP and 0.04 weight % calcium stearate were added to the fluff in the Henschel mixer.

Mixing and pelletizing involved the following steps:
1. Blends of high and low molecular weight fluff were weighed to give the desired ratio. 2. The powder blends were mixed for three minutes at high speed in the Henschel mixer with stabilizers. 3. The powder blends were force fed to the 1.5 inch Davis-Standard extruder with nitrogen protection. The temperature zones on the extruder were set at 221 C. Screw speed was 90 rpm. Extrusion rate was in the range of 30 to 40 pounds per hour. The screw had a 3:1 compression ratio and a 24:1 length to diameter ratio. A 40/80/40 mesh screen pack was used. The six hole die had ⅛ inch holes. A Cumberland Six Chopper was used for pelletizing. Melt temperatures were in the 230° to 250° C. range.

C. Film Blowing

The blends were converted to blown film using a 1.5 inch Davis-Standard extruder with a four inch Sano die with a Sano tower and take-off equipment. The Sano die was a bottom fed spiral design with a 0.76 mm die gap. The die was designed for use with high density, high molecular weight polyethylene. The extruder was a 1.5 inch Davis-Standard with a 24:1 length to diameter ratio. The feed screw had a 2.2:1 compression ratio. A 20/20 mesh screen pack was used. Only one mil film was used for evaluation. The blow-up ratio was 4:1. The frost line height was 26 inches, and the melt temperature was in the range of 230 to 265 C. Take-off speed was 31 feet/minute.

D. Film Evaluation

The film was evaluated by measuring a variety of properties. The test methods used are as described above.

The results obtained with the various blends are shown in the following tables.

TABLE XV
SUMMARY OF BLEND PROPERTIES

| | \multicolumn{7}{c}{BLEND NO.} | | | | | | | |
|---|---|---|---|---|---|---|---|
| | 1 | 2 | 3 | 4 | 5 | 6 | 7 |
| High MW Component: | | | | 13H | | | |
| HLMI, g/10 min. | | | | 1.45 | | | |
| Density, g/cc | | | | 0.9312 | | | |
| Concentration, wt. % | 50 | 52 | 54 | 56 | 58 | 60 | 62 |
| Low MW Component: | | | | 26L | | | |
| MI | | | | 98 | | | |
| Density | | | | 0.9600 | | | |
| Concentration, wt. % | 50 | 48 | 46 | 44 | 42 | 40 | 38 |
| Blend Properties | | | | | | | |
| MI, g/10 min. | 0.36 | 0.32 | 0.28 | 0.23 | 0.20 | 0.22 | 0.11 |
| HLMI, g/10 min. | 23.7 | 20.7 | 16.8 | 13.6 | 12.2 | 12.0 | 8.2 |
| Density, g/cc | 0.9475 | 0.9473 | 0.9466 | 0.9455 | 0.9444 | 0.9446 | 0.9438 |
| Flexural Modulus, MPa | 1057 | 1063 | 1089 | 1023 | 1004 | 1017 | 879 |
| Tensile Yield, MPa | 25.2 | 24.5 | 24.2 | 23.9 | 23.8 | 23.6 | 23.5 |
| Tensile Break, MPa | 34.5 | 34.7 | 37.6 | 37.5 | 38.8 | 37.7 | 37.8 |
| Elongation, % | 1070 | 1060 | 1320 | 1440 | 1700 | 1310 | 1630 |
| Hardness, Shore D | 65 | 65 | 65 | 65 | 65 | 64 | 64 |
| Bell ESCR, hrs | >1000 | >1000 | >1000 | >1000 | >1000 | >1000 | >1000 |
| Viscosity, Poise × $10^{-5}$ | 2.5 | 2.8 | 3.1 | 3.6 | 4.1 | 3.3 | 6.4 |
| RDI | 1.56 | 1.54 | 1.51 | 1.48 | 1.54 | 1.53 | 1.58 |
| Film Properties | | | | | | | |
| Dart Impact, g, 26" | 110 | 140 | 140 | 140 | 150 | 150 | 120 |
| Spencer Impact, J | 0.26 | 0.31 | 0.28 | 0.30 | 0.34 | 0.34 | 0.28 |
| MD Tear, g | 48 | 53 | 68 | 60 | 65 | 64 | 66 |
| TD Tear, g | 160 | 205 | 210 | 245 | 250 | 280 | 225 |
| Fish Eyes, ft$^{-2}$ | 39 | 22 | 16 | 14 | 12 | 5 | 5 |

[1]See Table XIV for characterization of blend components.

| | \multicolumn{7}{c}{BLEND NO.} | | | | | | | |
|---|---|---|---|---|---|---|---|
| | 8 | 8A | 8B | 9 | 10 | 9A | 10A | 11 |
| High MW Component: | | 3H | | | | 1H | | |
| HLMI, g/10 min. | | 0.37 | | | | 0.24 | | |
| Density, g/cc | | 0.9380 | | | | 0.9360 | | |
| Concentration, wt. % | | 50 | | | | 50 | | |

TABLE XV-continued
SUMMARY OF BLEND PROPERTIES

| Low MW Component: | | 23L | | 27L | 26L | 27L | 26L | 24L |
|---|---|---|---|---|---|---|---|---|
| MI, g/10 min. | | 212 | | 106 | 98 | 106 | 98 | 108 |
| Density, g/cc | | 0.9700 | | 0.9550 | 0.9600 | 0.9550 | 0.9600 | 0.9690 |
| Concentration, wt. % | | 50 | | 50 | 50 | 50 | 50 | 50 |
| Blend Properties | | | | | | | | |
| MI, g/10 min. | 0.10 | 0.09 | 0.11 | 0.07 | 0.07 | 0.06 | 0.06 | 0.06 |
| HLMI, g/10 min. | 9.4 | 9.1 | 10.0 | 6.7 | 7.0 | 5.1 | 5.4 | 5.0 |
| Density, g/cc | 0.9578 | 0.9579 | 0.9582 | 0.9490 | 0.9512 | 0.9492 | 0.9524 | 0.9578 |
| Flexural Modulus, MPa | 1543 | 1550 | 1567 | 1103 | 1250 | 1108 | 1250 | 1400 |
| Tensile Yield, MPa | — | — | — | 24.8 | 25.6 | 24.5 | 25.9 | 27.8 |
| Tensile Break, MPa | — | — | — | 38.0 | 37.6 | 37.0 | 39.1 | 31.0 |
| Elongation, % | — | — | — | 1420 | 1140 | 1480 | 1300 | 820 |
| Hardness, Shore D | — | — | — | 64 | 63 | 63 | 65 | 66 |
| Bell ESCR, hrs | — | — | — | >1000 | >1000 | >1000 | >1000 | >1000 |
| Viscosity, Poise × $10^{-5}$ | — | — | — | 10.0 | 9.8 | 9.7 | 10.0 | 9.6 |
| RDI | — | — | — | 1.75 | 1.72 | 1.75 | 1.71 | 1.71 |
| Film Properties | | | | | | | | |
| Dart Impact, g, 26" | 210 | 190 | 190 | 230 | 230 | 210 | 200 | 240 |
| Spencer Impact, J | 0.41 | 0.41 | 0.42 | 0.49 | 0.61 | 0.50 | 0.57 | 0.57 |
| MD Tear, g | 34 | 39 | 30 | 67 | 67 | 53 | 46 | 49 |
| TD Tear, g | 300 | 320 | 410 | 290 | 330 | 290 | 340 | 220 |
| Fish Eyes, $ft^{-2}$ | 30 | 50 | 400 | 660 | 1000 | 750 | 1200 | 1100 |

Notes:
Three separate blends were identically prepared and converted into film. The blend and film properties are similar except for blend 8B which displays very high TD tear and abnormally high fish eyes. The reason for the high fish eye count is not known.
Dashes indicate no properties were determined
Blends 9, 9A and 10, 10A are duplicates.

| | BLEND NO. | | | | | | | | |
|---|---|---|---|---|---|---|---|---|---|
| | 12 | 12A | 12B | 12C | 13 | 14 | 15 | 16 | 17 |
| High MW Component: | | | 5H | | 4H | 6H | | 7H | |
| HLMI, g/10 min. | | | 1.56 | | 1.41 | 0.89 | | 1.40 | |
| Density, g/cc | | | 0.9500 | | 0.9490 | 0.9480 | | 0.9445 | |
| Concentration, wt. % | | | 62 | | 62 | 56 | 59 | 59 | 55 |
| Low MW Component: | | | 24L | | 24L | 25L | 27L | 22L | 20L |
| MI, g/10 min. | | | 108 | | 108 | 150 | 106 | 146 | 67 |
| Density, g/cc | | | 0.9690 | | 0.9690 | 0.9700 | 0.9550 | 0.9700 | 0.9680 |
| Concentration, wt. % | | | 38 | | 38 | 44 | 41 | 41 | 45 |
| Blend Properties | | | | | | | | | |
| MI, g/10 min. | 0.14 | 0.13 | 0.13 | 0.12 | 0.20 | 0.10 | 0.17 | 0.18 | 0.12 |
| HLMI, g/10 min. | 10.0 | 9.4 | 9.6 | 8.8 | 8.9 | 7.7 | 10.7 | 10.6 | 9.5 |
| Density, g/cc | 0.9580 | 0.9600 | 0.9600 | 0.9598 | 0.9597 | 0.9609 | 0.9510 | 0.9570 | 0.9547 |
| Flexural Modulus, MPa | 1667 | 1613 | 1610 | 1594 | 1570 | 1570 | 1274 | 1566 | 1551 |
| Tensile Yield, MPa | 29.2 | 29.0 | 28.8 | 29.0 | 29.3 | 28.0 | 26.8 | 29.8 | 30.1 |
| Tensile Break, MPa | 40.1 | 38.5 | 39.6 | 43.0 | 39.3 | 33.2 | 38.1 | 35.7 | 33.4 |
| Elongation, % | 1200 | 1100 | 1200 | 1400 | 1200 | 980 | 1300 | 1000 | 900 |
| Hardness, Shore D | 68 | 68 | 68 | 67 | 65 | 67 | 65 | 67 | 67 |
| Bell ESCR, hrs | 147 | 147 | 154 | 101 | 147 | 173 | 424 | >1000 | >1000 |
| Viscosity, Poise × $10^{-5}$ | — | — | — | — | 3.4 | 6.0 | 3.9 | 4.1 | 4.9 |
| RDI | 1.56 | 1.56 | 1.57 | 1.59 | 1.44 | 1.63 | 1.51 | 1.48 | 1.53 |
| Film Properties | | | | | | | | | |
| Dart Impact, g, 26" | 110 | 110 | 96 | 84 | 45 | 130 | 100 | 85 | 110 |
| Spencer Impact, J | 0.30 | 0.24 | 0.28 | 0.30 | 0.28 | 0.28 | 0.31 | 0.30 | 0.28 |
| MD Tear, g | 30 | 25 | 28 | 30 | 34 | 33 | 47 | 37 | 30 |
| TD Tear, g | 170 | 130 | 110 | 110 | 250 | 130 | 200 | 210 | 200 |
| Fish Eyes, $ft^{-2}$ | 3.5 | 1.0 | 0.5 | 1.5 | 10 | 10 | 9 | 9 | 9 |

Note:
Four seperate blends of identical composition were prepared and converted into film.

| | BLEND NO. | | | | | | |
|---|---|---|---|---|---|---|---|
| | 18 | 19 | 20 | 21 | 22 | 23 | 24 |
| High MW Component: | | 8H | | | 9H | | |
| HLMI, g/10 min. | | 2.04 | | | 1.80 | | |
| Density, g/cc | | 0.9419 | | | 0.9388 | | |
| Concentration, wt. % | 62 | 63 | 62.5 | 58 | 61 | 63 | 60 |
| Low MW Component: | 27L | 22L | 20L | 27L | 22L | 20L | 27L |
| MI, g/10 min. | 106 | 146 | 67 | 106 | 146 | 67 | 106 |
| Density, g/cc | 0.9550 | 0.9700 | 0.9680 | 0.9550 | 0.9700 | 0.9680 | 0.9550 |
| Concentration, wt. % | 38 | 37 | 37.5 | 42 | 39 | 37 | 40 |
| Blend Properties | | | | | | | |
| MI, g/10 min. | 0.21 | 0.21 | 0.15 | 0.26 | 0.25 | 0.17 | 0.20 |
| HLMI, g/10 min. | 10.6 | 10.6 | 8.4 | 14.0 | 14.0 | 8.7 | 11.0 |
| Density, g/cc | 0.9487 | 0.9547 | 0.9527 | 0.9482 | 0.9540 | 0.9528 | 0.9476 |
| Flexural Modulus, MPa | 1189 | 1353 | 1374 | 1165 | 1432 | 1368 | 1138 |
| Tensile Yield, MPa | 25.7 | 28.4 | 28.1 | 24.4 | 27.8 | 27.3 | 24.3 |
| Tensile Break, MPa | 36.9 | 38.1 | 39.4 | 37.3 | 38.9 | 40.9 | 37.7 |
| Elongation, % | 1200 | 1100 | 1100 | 1600 | 1100 | 1100 | 1500 |
| Hardness, Shore D | 65 | 67 | 67 | 65 | 66 | 66 | 65 |
| Bell ESCR, hrs | >1000 | >1000 | >1000 | >1000 | >1000 | >1000 | >1000 |

TABLE XV-continued
SUMMARY OF BLEND PROPERTIES

| | | | | | | | |
|---|---|---|---|---|---|---|---|
| Viscosity, Poise × 10⁻⁵ | 3.6 | 3.7 | 4.5 | 3.2 | 3.2 | 4.2 | 4.0 |
| RDI | 1.45 | 1.43 | 1.49 | 1.48 | 1.45 | 1.45 | 1.46 |
| Film Properties | | | | | | | |
| Dart Impact, g, 26" | 76 | 79 | 86 | 73 | 110 | 130 | 92 |
| Spencer Impact, J | 0.26 | 0.30 | 0.28 | 0.23 | 0.35 | 0.32 | 0.27 |
| MD Tear, g | 41 | 36 | 31 | 39 | 44 | 51 | 49 |
| TD Tear, g | 230 | 210 | 200 | 210 | 270 | 310 | 260 |
| Fish Eyes, ft⁻² | 3 | 3 | 3 | 20 | 28 | 12 | 5 |

| | BLEND NO. | | | | | | |
|---|---|---|---|---|---|---|---|
| | 25 | 26 | 27 | 28 | 29 | 30 | 31 |
| High MW Component: | 10H | | | 11H | | | 12H |
| HLMI, g/10 min. | 1.48 | | | 0.71 | | | 1.41 |
| Density, g/cc | 0.9393 | | | 0.9377 | | | 0.9331 |
| Concentration, wt. % | 59 | 59 | 60.7 | 61 | 60.6 | 59.1 | 58.8 |
| Low MW Component: | 22L | 20L | 27L | 22L | 20L | 27L | 20L |
| MI, g/10 min. | 146 | 67 | 106 | 146 | 67 | 106 | 146 |
| Density, g/cc | 0.9700 | 0.9680 | 0.9550 | 0.9700 | 0.9680 | 0.9550 | 0.9700 |
| Concentration, wt. % | 41 | 41 | 39.3 | 39 | 39.4 | 40.9 | 41.2 |
| Blend Properties | | | | | | | |
| MI, g/10 min. | 0.20 | 0.20 | 0.28 | 0.30 | 0.25 | 0.22 | 0.21 |
| HLMI, g/10 min. | 11.0 | 10.0 | 13.0 | 15.0 | 12.0 | 13.0 | 12.0 |
| Density, g/cc | 0.9546 | 0.9536 | 0.9471 | 0.9534 | 0.9524 | 0.9490 | 0.9499 |
| Flexural Modulus, MPa | 1437 | 1400 | 1102 | 1373 | 1376 | 1018 | 1268 |
| Tensile Yield, MPa | 27.6 | 28.1 | 24.7 | 27.4 | 27.2 | 22.5 | 25.1 |
| Tensile Break, MPa | 38.6 | 43.1 | 37.7 | 38.1 | 39.9 | 37.0 | 38.7 |
| Elongation, % | 1200 | 1500 | 1600 | 1100 | 1100 | 1800 | 1100 |
| Hardness, Shore D | 66 | 67 | 65 | 66 | 66 | 64 | 66 |
| Bell ESCR, hrs | >1000 | >1000 | >1000 | >1000 | >1000 | >1000 | >1000 |
| Viscosity, Poise × 10⁻⁵ | 4.2 | 4.1 | 3.0 | 2.9 | 3.3 | 3.0 | 3.8 |
| RDI | 1.48 | 1.45 | 1.42 | 1.43 | 1.41 | 1.52 | 1.46 |
| Film Properties | | | | | | | |
| Dart Impact, g, 26" | 100 | 120 | 83 | 89 | 86 | 140 | 150 |
| Spencer Impact, J | 0.28 | 0.31 | 0.27 | 0.27 | 0.28 | 0.23 | 0.35 |
| MD Tear, g | 36 | 43 | 45 | 40 | 46 | 57 | 52 |
| TD Tear, g | 300 | 250 | 210 | 180 | 180 | 330 | 300 |
| Fish Eyes, ft⁻² | 25 | 6 | 5 | 6 | 29 | 30 | 7 |

| | BLEND NO. | | | |
|---|---|---|---|---|
| | 32 | 33 | 34 | 35 |
| High MW Component: | | | 13H | |
| HLMI, g/10 min. | | | 1.45 | |
| Density, g/cc | | | 0.9312 | |
| Concentration, wt. % | 56.4 | 59.3 | 59 | 56.9 |
| Low MW Component: | 20L | 27L | 22L | 20L |
| MI, g/10 min. | 67 | 106 | 146 | 67 |
| Density, g/cc | 0.9675 | 0.9550 | 0.9700 | 0.9675 |
| Concentration, wt. % | 43.6 | 40.7 | 41 | 43.1 |
| Blend Properties | | | | |
| MI, g/10 min. | 0.21 | 0.22 | 0.22 | 0.23 |
| HLMI, g/10 min. | 13.0 | 13.0 | 13.0 | 12.0 |
| Density, g/cc | 0.9500 | 0.9433 | 0.9489 | 0.9494 |
| Flexural Modulus, MPa | 1255 | 972 | 1236 | 1226 |
| Tensile Yield, MPa | 26.9 | 23.0 | 26.1 | 26.5 |
| Tensile Break, MPa | 38.3 | 36.4 | 38.4 | 39.7 |
| Elongation, % | 1100 | 1700 | 1400 | 1300 |
| Hardness, Shore D | 65 | 63 | 66 | 65 |
| Bell ESCR, hrs | >1000 | >1000 | >1000 | >1000 |
| Viscosity, Poise × 10⁻⁵ | 3.8 | 3.5 | 3.2 | 3.7 |
| RDI | 1.51 | 1.50 | 1.52 | 1.47 |
| Film Properties | | | | |
| Dart Impact, g, 26" | 120 | 130 | 150 | 150 |
| Spencer Impact, J | 0.31 | 0.30 | 0.34 | 0.32 |
| MD Tear, g | 48 | 64 | 57 | 53 |
| TD Tear, g | 250 | 260 | 280 | 230 |
| Fish Eyes, ft⁻² | 13 | 11 | 32 | 24 |

Some commercially available film resins were converted into film as described. The properties found are shown in Table XVI together with the properties of some of the films/resins blends of this invention.

DISCUSSION OF RESULTS

A. Effects of Ratio of Components

One of the most important facts discovered in this work relating to film resins was that, in order to get uniform, homogeneous blends from two widely different molecular weight polymers using continuous processing equipment, it is preferred that >50% by weight of the blend be of the high molecular weight component. This is not necessarily true if batch processing equipment, such as a Banbury, is used to homogenize the mixture.

The explanation for this phenomenon may be that at compositions of less than 50% high molecular weight polymer, the low molecular weight polymer becomes the continuous phase. Due to the extremely low viscosity of the low molecular weight polymer, it is very difficult to apply the necessary shear stresses to the high molecular weight particles to make them disperse uniformly. However, when the concentration of high molecular weight polymer exceeds 50%, it becomes the continuous phase and can easily transmit the shear stresses to the low molecular weight particles. In order to be safe and achieve the best dispersion, it is preferred that the film composition contains at least 52% high molecular weight polymer.

The effects of film blend composition is presented in Table XV, blends 1 through 7. The film fish eye count is a convenient method of measuring the homogeneity of the blend. Note that the fish eye count was at a high level of 39/ft$^2$ for the 50/50 blend, but decreased to 5/ft$^2$ for the 60/40 blend. Also, the film tear strength improves with increasing high molecular weight polymer content. The exact degree of dispersion for any particular blend will depend upon the capabilities of the equipment used. However, the relative effect of concentration would be expected to apply in any equipment.

As the density of the high molecular weight component decreased from about 0.950 g/cc of blend 12 to about 0.931 g/cc of blend 35 the results show that a substantial increase in Dart impact, Elmendorf tear and ESCR values were obtained. That is, Dart impact increased from 45 to 150 g, the MD tear increased from 25 to 64 g, the TD tear increased from 110 to 330 g and ESCR increased from 101 to greater than 1000 hours. The MI, density and flexural modulus of the resulting blends depended upon the values of the high and low molecular weight components.

The data in Table XVI demonstrate at approximately equal blend MI and density values relative to Hizex and Hostalen commercial resins that the invention blends generally exhibit superior Elmendorf tear, Dart impact and Spencer impact values. However, the invention blends have unacceptably high fisheyes for film applications but may be suitable for other applications such as blow molded or injection molded containers and the like.

Based on the data presented, an invention blend, when optimized for film applications, is calculated to have acceptably low fisheyes and the physical proper-

TABLE XVI

| COMPARISON OF COMMERCIAL FILM RESINS WITH INVENTION BLENDS | | | | | | |
|---|---|---|---|---|---|---|
| | Commercial Film Resins | | Examples of Invention Blends | | | |
| | Hizex 7000F | Hostalen GM9255F | Blend No. 8A | Blend No. 11 | Blend No. 10A | Blend No. 10 |
| Melt Index, g/10 min. | 0.03 | 0.06 | 0.09 | 0.06 | 0.06 | 0.07 |
| HLMI, g/10 min. | 10.1 | 9.7 | 9.1 | 5.0 | 5.4 | 7.0 |
| Density, g/cc | 0.9533 | 0.9578 | 0.9579 | 0.9578 | 0.9524 | 0.9512 |
| Flexural Modulus, MPa | 1327 | 1476 | 1550 | 1400 | 1250 | 1250 |
| Tensile @ yield, MPa | 28.6 | 27.0 | N.A. | 27.8 | 25.9 | 25.6 |
| Tensile @ Break, MPa | 16.7 | 39.2 | N.A. | 31.0 | 39.1 | 37.6 |
| Elongation, % | 90 | 1143 | N.A. | 820 | 1300 | 1140 |
| Hardness, Shore D | 68 | 66 | N.A. | 66 | 65 | 63 |
| Bell ESCR, hrs | >1000 | >1000 | N.A. | >1000 | >1000 | >1000 |
| Dart Impact, g, (26") | 195 | 179 | 190 | 240 | 200 | 230 |
| Spencer Impact, J | 0.356 | 0.359 | 0.41 | 0.57 | 0.57 | 0.61 |
| Elmendorf Tear, g | | | | | | |
| MD | 53 | 38 | 39 | 49 | 46 | 67 |
| TD | 128 | 100 | 320 | 220 | 340 | 330 |
| Fish Eyes, ft$^{-2}$ | 4 | 10 | 50 | 1100 | 1200 | 1000 |

The results obtained for blends 8-11 indicate that blends exhibiting excellent impact properties, high tear strengths, high ESCR values and acceptable to high flexural modulus values are obtained with a 50/50 weight percent blend of high molecular weight and low molecular weight components. The high molecular weight component had a HLMI of about 0.2-0.4 with a density of about 0.935 g/cc while low molecular weight polymers having MI values ranging from about 100-210 and densities ranging from about 0.955-0.970 g/cc were employed. The data show that the high fisheye counts (660 to 1200) for blends 9-11 can be substantially reduced by approximately doubling the MI of the low molecular weight component, e.g. from about 100 to about 200.

In the series of blends 12-35 the high molecular weight component varied from 55-63 weight percent, the HLMI varied from about 0.9-2 and the density ranged from about 0.931-0.950 g/cc. The low molecular component varied from 45-37 weight percent, the MI varied from about 70-145 and the density ranged from about 0.955-0.970 g/cc. All of the blends exhibited a low fisheye count (0.5-29) showing the importance of having greater than 50 weight percent high molecular ties given in Table XVII.

The calculated data given in Table XVII suggest that an optimized blend compared to commercial resins of similar melt index and density values will exhibit a superior balance of impact strength and tear strength.

Multiple regression analyses on the data obtained have been made; they show that the weight fraction of high molecular weight polymer has a negative effect upon the HLMI, MI and density of the blend. Increasing this variable has a positive effect upon both the MD and TD tear strength. Surprisingly, the dart and Spencer impact strengths were not significantly affected by the concentration of high molecular weight component over the range of compositions studied. The blends were composed of between 50 and 60% high molecular weight polymer. This relatively narrow range was desirable for two reasons. (1.) As discussed above, there is a practical or economical lower limit for the film resin blend of 50% high molecular weight component due to the homogenization problem. (2.) The melt index and high load melt index drop rapidly as the fraction of high molecular weight polymer increases. Thus, processability deteriorates at higher levels. This rather restricted range accounts for the fact that this variable does not show up as a statistically significant factor in the regression analysis of the dart and Spencer impact strength.

B. Effects of Molecular Weights of Components

The molecular weight (here described by HLMI and MI) of the high molecular weight component is the second most important factor in determining the properties of a film resin blend. Also, the tear strength and Spencer impact strength are all functions of this variable. Thus, there is a definite advantage in connection with film resin applications in keeping the HLMI of the high molecular weight component as low as possible. Low HLMI values of the high molecular weight component make it difficult to maintain the melt index and HLMI of the blend at a sufficiently high level to achieve good processability while still adhering to the >50% rule discussed above.

The molecular weight of the low molecular weight component also enters into consideration but only to a minor extent. The melt index of the low molecular weight component does not appear as a significant variable in any of the film property regression analyses (see Table III). In fact, it is only important in determining the HLMI (but not the MI) of the blend. It appears that this component acts only as a lubricant or diluent to affect the HLMI of the blend. Thus, it is important to keep the MI of the low molecular weight material as high as possible in order to keep the HLMI of the blend sufficiently high to achieve good processability. Most preferably, the MI of the low molecular weight component is at least 200.

C. Effects of Densities of Components

The third most important variable in determining the film properties of a blend is the density of the high molecular weight component. This varaible has a negative coefficient in each of the film property regression equations except the Spencer impact equation, where it was not significant. Thus, there is a definite advantage in keeping the density of the high molecular weight component as low as possible for maximum film properties. Of course, this must also be balanced against any specifications on density and stiffness.

On the other hand, the density of the low molecular weight component only shows up as significant in the regression equations for blend density and MD tear strength. Even in these cases it only has about ⅓ the effect of the density of the high molecular weight component. Thus, in order to achieve a high blend density and stiffness with high film strength properties it is best to use a high density low molecular weight component and a low density high molecular weight component. In other words, there is a definite advantage to placing the comonomer in the high molecular weight end of the molecular weight distribution of the blend. This is one of the advantages of using a blend approach to optimizing a polymer's molecular structure. There is no known way of controlling the distribution of comonomer with a single reactor product.

D. Comparison With Competitive Resins

Data for two leading commercial high molecular weight film resins, Hizex 7000F and Hostalen GM 9255F, are presented in Table XVI and compared with several of the inventions blend polymers. These films were all produced under identical conditions. Inspection of these results shows that the invention blends are generally superior to the commercial resins in all film properties. The greatest advantage for the blends appears in the very important TD tear strength where the blends of this invention surpass the commercial resins by a factor of at least 2.

The mathematical models of the blend resin properties of this invention may also be used to formulate a resin to match the HLMI, MI and density of a commercial polymer. Table XVII illustrates these results for a blend which exactly matches the melt index, HLMI and density of Hostalen GM 9255F.

TABLE XVII

COMPARISON OF COMMERCIAL FILM RESINS WITH CALCULATED PROPERTIES OF OPTIMIZED INVENTION BLEND

|  | Competitive Resins | | Calculated Blend* | | |
|---|---|---|---|---|---|
|  | Hizex 7000F | Hostalen GM9255F | Calculated Values | 95% Confidence Limits | |
| Melt Index | 0.03 | 0.06 | 0.06 | 0.02 | 0.10 |
| HLMI | 10.1 | 9.7 | 9.7 | 5.5 | 13.9 |
| Density, g/cc | 0.9533 | 0.9578 | 0.9577 | 0.9555 | 0.9600 |
| Dart Impact, g | 195 | 179 | 200 | 190 | 210 |
| Spencer Impact, J | 0.356 | 0.359 | 0.46 | 0.43 | 0.49 |
| Elmendorf Tear, g | | | | | |
| MD | 53 | 38 | 41 | 35 | 47 |
| TD | 128 | 100 | 280 | 220 | 350 |

*Blend Composition

High MW Component: HLMI = 0.35 g/10 min.
Density = 0.940 g/cc
Weight Fraction = 52%
Low MW Component: Melt Index = 300 g/10 min.
Density = 0.970 g/cc
Weight Fraction = 48%

E. Comparison of Hostalen Film Resin With Invention Film Resin Blend

A commercially available film resin was compared with the blend of this invention with the following results:

TABLE XVIIA

|  | Invention Blend* | Hostalen GM 9255F |
|---|---|---|
| HLMI, g/10 min. | 7.4 | 9.7 |
| MI, g/10 min. | 0.09 | 0.06 |
| Density, g/cc | 0.946 | 0.9578 |
| Dart Impact, g, 26" | 213 | 190 |
| Spencer Impact, J | 0.55 | 0.41 |
| Elmendorf Tear, g | | |
| MD | 37 | 38 |
| TD | 394 | 100 |
| Fisheyes, ft$^{-2}$ | 12 | 10 |
| Film Thickness, mils | 1.0 | 1.0 |
| Blow Up Ratio | 4:1 | 4:1 |

*Blend Composition

High MW Component: HLMI = 0.36 g/10 min.
Density = 0.9340 g/cc
Weight Fraction = 52%
Low MW Component: MI = 112 g/10 min.
Density = 0.9571 g/cc
Weight Fraction = 48%

The results in Table XVIIA show the invention blend to be superior to the commercial resin in dart and Spencer impact values, equivalent in MD Elmendorf tear and about 4-fold better in TD Elmendorf tear. The fisheye content of each film is about the same. Note that film properties of this polymer are all significantly superior to those of the Hostalen resin. Thus, both the actual, observed blend data and the predictions from the models are in agreement with the conclusion that a superior film resin can be produced by this technique.

F. Environmental Stress Crack Resistance and Stiffness

Another important property of the blend resins of this invention is their outstanding environmental stress crack resistance. Several of the samples are compared with data from polymers of comparable melt index and density in Table XVIII produced with a commercially available chromium oxide supported on coprecipitated silica-titania (cogel) catalyst.

TABLE XVIII

COMPARISON OF ESCR DATA FOR BLENDS WITH COMPARABLE COGEL RESINS

| | Melt Index (g/10 min) | Density (g/cc) | Flexural Modulus (MPa) | Bell ESCR (hrs) |
|---|---|---|---|---|
| | | 0.9500 | | |
| Control | 0.19 | 0.9503 | 1179 | 530 |
| Control | 0.12 | 0.9503 | 1172 | 400 |
| Invention Blend | 0.21 | 0.9500 | 1255 | >1000 |
| | | 0.9536 | | |
| Control | 0.24 | 0.9536 | 1303 | 150 |
| Control | 0.22 | 0.9537 | 1317 | 115 |
| Invention Blend | 0.20 | 0.9536 | 1400 | >1000 |
| | | 0.9540 | | |
| Control | 0.30 | 0.9543 | 1372 | 110 |
| Control | 0.20 | 0.9540 | 1296 | 130 |
| Invention Blend | 0.12 | 0.9547 | 1551 | >1000 |
| | | 0.9570 | | |
| Control | 0.17 | 0.9573 | 1374 | 326* |
| Control | 0.18 | 0.9568 | 1360 | 326* |
| Control | 0.19 | 0.9572 | 1410 | 338* |
| Invention Blend | 0.18 | 0.9570 | 1556 | >1000 |

*These three polymers were made from 1000° F. activation temperature catalysts to give maximum ESCR.

Note that in all cases the cogel polymers have ESCR values of only a few hundred hours, while all of the blends have ESCR values of >1000 hours. In fact, not one single specimen failed during the 1000 hours for any of the blends in Table XVIII.

Significantly, the stiffness of these polymers is in every case greater than that of the comparable cogel polymers by approximately 100 MPa. Thus the resins of this invention have achieved the outstanding feat of both superior stiffness and ESCR.

Several of these polymer blends were evaluated in blow molded bottles, where it was noted that they were remarkably uniform and free of streaks. Their color and odor were also excellent. These resins were judged to be superior to typical polyethylene resins in this regard.

Example XII

In this example, 42 blends were prepared from resins within the limits specified above and their physical properties and flow properties were determined. Results are listed in Table XV. Mathematical regression analysis of the results obtained was made to ascertain the significance of the independent variables on blend properties. The following significant dependencies were found:

$(HLMI)_{Blend} = 55.67 - 108.33(W_1) + 11.61 (HLMI_1) + 0.021\ MI_2$ $(MI)_{Blend} = 0.8968 - 1.761(W_1) + 0.231(HLMI_1)$ $(Density)_{Blend} = -0.053 - 0.0393(W_1) + 0.644(D_1) + 0.439(-D_2)$ $(Dart\ Impact)_{Blend} = 2165 - 2063(D_1) - 75.07(HLMI_1)$ $[Spencer(Joules)]_{Blend} = 0.5107 - 0.1369(HLMI)_1$ $(Elmendorf, MD)_{Blend} = 2038 + 152.8(W_1) - 1671(D_1) - 9.74(HLMI_1) - 518(D_2)$ $(Elmendorf, TD)_{Blend} = 5870 + 83.88(W_1) - 6367(D_1) - 106.7(HLMI_1)$ $W_1$ = Weight fraction of high MW component
$D_1$ = Density of high MW comonent
$HLMI_1$ = HLMI of high MW component
$D_2$ = Density of low MW component
$MI_2$ = MI of low MW component Conclusions reached from multiple regression analysis:

1. The HLMI and MI of the blend is primarily dependent on weight fractions and HLMI of the high molecular weight component.
2. Density of the blend is primarily dependent on the densities of each of the components.
3. Dart impact of the blend is primarily dependent on the density and HLMI of the high molecular weight component.
4. Spencer impact of the blend is primarily dependent on the HLMI of the high molecular weight component.
5. Elmendorf tear, MD, is dependent on weight fraction, density and HLMI of the high molecular weight component and the density of the low molecular weight component.
6. Elmendorf tear, TD, is dependent on the weight fractions, density and HLMI of the high molecular weight component.

Reasonable variations and modifications can be made in this invention without departing from the spirit and scope thereof.

What is claimed is:

1. Process to produce an ethylene polymer film comprising extruding a fluid ethylene polymer blend, the polymer component of which consists essentially of
   (a) 40-70 parts by weight of a high molecular weight ethylene polymer having a high load melt index (HLMI) in the range of about 0.1 to about 1.5 g/10 min and a density in the range of 0.930 to 0.940 g/cc, and having a heterogeneity index of <10, and
   (b) 60-30 parts by weight of a low molecular weight ethylene polymer having a melt index (MI) in the range of 45-300 g/10 minutes and a density of above about 0.950 and having a heterogeneity index of <6.

2. A process in accordance with claim 1 wherein both ethylene polymers blended have a narrow molecular weight distribution.

3. A process in accordance with claim 1 wherein said high molecular weight ethylene polymer is a copolymer of ethylene and 0 to 30 weight percent mono-1-olefin having 3-10 carbon atoms and said low molecular weight ethylene polymer is an ethylene homopolymer.

4. Process to produce an ethylene polymer film comprising extruding a fluid ethylene polymer blend, the polymer component of which consists essentially of
   (a) 40-70 parts by weight of a high molecular weight ethylene copolymer having a high load melt index (HLMI) in the range of 0.2-0.6 g/10 min and a density in the range of 0.930 to 0.940 g/cc, and having a heterogeneity index of <10, and (b) 60-30 parts by weight of a low molecular weight ethylene homopolymer having a melt index (MI) in the range of 100–300 g/10 minutes and a density of above about 0.950 and having a heterogeneity index of <6 wherein the low molecular weight ethylene homopolymer is essentially linear and wherein the high molecular weight ethylene copolymer is also essentially linear and has essentially only short chain branching from the comonomer.

5. Process in accordance with claim 1 wherein said blend is extruded to form a hollow tube-like extrudate and wherein said tube-like extrudate immediately after said extrusion is blow-expanded to form a tube-like film extrudate of substantially wider dimensions than those of the extruder die.

6. Process as in claim 5 wherein the high molecular weight ethylene polymer is randomly copolymerized from ethylene and 5 to 10 weight % of a mono-1-olefin of 4 to 8 carbon atoms.

7. Process in accordance with claim 6 wherein said polymer blend is directly force-fed in fluff form to a film extruder to produce said film.

8. Film produced in accordance with claim 1.
9. Film produced in accordance with claim 2.
10. Film produced in accordance with claim 5.
11. Film produced in accordance with claim 7.

* * * * *